(12) United States Patent
Sadri et al.

(10) Patent No.: US 7,359,893 B2
(45) Date of Patent: Apr. 15, 2008

(54) DELIVERING ITEMS BASED ON LINKS TO RESOURCES ASSOCIATED WITH SEARCH RESULTS

(75) Inventors: Pasha Sadri, San Jose, CA (US); Eckart Walther, Palo Alto, CA (US); Thai Tran, Redwood City, CA (US)

(73) Assignee: Yahoo! Inc., Sunnyvale, CA (US)

( * ) Notice: Subject to any disclaimer, the term of this patent is extended or adjusted under 35 U.S.C. 154(b) by 452 days.

(21) Appl. No.: 10/816,460

(22) Filed: Mar. 31, 2004

(65) Prior Publication Data

US 2005/0222966 A1    Oct. 6, 2005

(51) Int. Cl.
    *G06F 17/30* (2006.01)
(52) U.S. Cl. ............... 707/3; 707/5; 707/10; 709/219; 709/224
(58) Field of Classification Search ........... 707/1–10, 707/100–102, 104.1; 709/203, 217–219, 709/224, 245; 715/513, 968, 505, 762
    See application file for complete search history.

(56) References Cited

U.S. PATENT DOCUMENTS

| | | | |
|---|---|---|---|
| 5,796,952 A | | 8/1998 | Davis et al. |
| 5,802,518 A | * | 9/1998 | Karaev et al. ................ 707/9 |
| 5,819,271 A | * | 10/1998 | Mahoney et al. ............. 707/9 |
| 5,864,846 A | * | 1/1999 | Voorhees et al. ............. 707/5 |
| 5,864,871 A | * | 1/1999 | Kitain et al. ............. 707/104.1 |
| 5,877,766 A | | 3/1999 | Bates et al. |
| 6,006,217 A | * | 12/1999 | Lumsden ...................... 707/2 |
| 6,070,157 A | * | 5/2000 | Jacobson et al. ............. 707/1 |
| 6,078,866 A | | 6/2000 | Buck et al. |
| 6,098,065 A | | 8/2000 | Skillen et al. |
| 6,098,081 A | * | 8/2000 | Heidorn et al. ........... 715/501.1 |

(Continued)

FOREIGN PATENT DOCUMENTS

WO    WO 98/36366 A1    8/1998

(Continued)

OTHER PUBLICATIONS

Warren Sack, MIT Media Laboratory, "Conversation Map: A Content-Based Usenet Newsgroup Browser", 2000, ACM, pp. 233-240.

(Continued)

*Primary Examiner*—Christian Chace
*Assistant Examiner*—Jacques Veillard
(74) *Attorney, Agent, or Firm*—Hickman Palermo Truong & Becker LLP

(57) ABSTRACT

Techniques are described for delivering search results pages to the users of a search engine, where one or more search result listings on the search results pages include one or more items that are associated with links to resources that satisfy a related search and that satisfy a specified condition. The items that are delivered with the search results may be associated with a party that is different than the party that controls the resource to which the link is associated, and may be delivered such that any item that is displayed based on the item's association with a link to a resource is displayed in a frame of display that is different than a frame of the display in which the link to which the item is associated is displayed.

36 Claims, 2 Drawing Sheets

U.S. PATENT DOCUMENTS

| | | | |
|---|---|---|---|
| 6,102,406 A | | 8/2000 | Miles et al. |
| 6,122,647 A | * | 9/2000 | Horowitz et al. ............ 715/513 |
| 6,128,663 A | * | 10/2000 | Thomas ...................... 709/228 |
| 6,243,104 B1 | | 6/2001 | Murray |
| 6,269,361 B1 | | 7/2001 | Davis et al. |
| 6,292,802 B1 | * | 9/2001 | Kessenich et al. .......... 707/101 |
| 6,311,194 B1 | * | 10/2001 | Sheth et al. ................. 715/505 |
| 6,321,091 B1 | | 11/2001 | Holland |
| 6,324,264 B1 | | 11/2001 | Wiener et al. |
| 6,338,068 B1 | | 1/2002 | Moore et al. |
| 6,424,968 B1 | | 7/2002 | Broster et al. |
| 6,427,020 B1 | | 7/2002 | Rhoads |
| 6,516,311 B1 | | 2/2003 | Yacoby et al. |
| 6,529,899 B1 | | 3/2003 | Kraft et al. |
| 6,564,208 B1 | * | 5/2003 | Littlefield et al. ............. 707/3 |
| 6,711,567 B2 | | 3/2004 | Littlefield et al. |
| 6,999,959 B1 | * | 2/2006 | Lawrence et al. ............. 707/5 |
| 7,024,405 B2 | * | 4/2006 | Salerno et al. ................. 707/3 |
| 7,058,624 B2 | * | 6/2006 | Masters ......................... 707/3 |

FOREIGN PATENT DOCUMENTS

| | | |
|---|---|---|
| WO | WO 99/12106 A2 | 3/1999 |

OTHER PUBLICATIONS

Sougata Mukherjea et al., C&C Research Laboratories, NEC USA Inc., "Using Clustering and Visualization for Refining the Results of a WWW Image Search Engine", 2000, ACM, pp. 29-35.

Dmitri Roussinov et al., Department of MIS, University of Arizona, "Information Forage through Adaptive Visualization", 1998, ACM, pp. 303-304.

The Search Engine Report, "GoTo Sells Positions," Mar. 3, 1998, pp. 1-5.

GoTo.com, Inc., "GoTo Search Results: search engine," Aug. 19, 1998, 5 pages.

GoTo.com, Inc., "GoTo.com Combines Inktomi Search Capability With Their Makret Driven Advertising Model," Jun. 15, 1998, pp. 1-3.

GoTo.com, Inc., "GoTo.com Announces First Round of Financing Totaling More Than $6 Million, Led by Draper Fisher Jurvetson," May 19, 1998, pp. 1-3.

GoTo.com, Inc., "Advertiser FAQ on Getting Listed," Aug. 14, 1998, pp. 1-7.

GoTo.com, Inc., "GoTo.com Launches New Account Management Tool!," Mar. 1999, pp. 1-2.

GoTo.com, Inc., "GoTo Sells Positions," Mar. 3, 1998, pp. 1-5.

FindWhat.com, "Promote Your Web Site on Findwhat," Sep. 3, 1999, http://www.findwhat.com/static/ab_promote.html, pp. 1-2.

FindWhat.com, "Frequently Asked Questions," Sep. 3, 1999, http://www.findwhat.com.static/MK_FAQ.html, pp. 1-3.

FindWhat.com, "Bid for Keywords on FindWhat.com," Sep. 3, 1999, http://www.findwhat.com/signup/signup.asp, pp. 1-2.

FindWhat.com, "BeFirst.com Selects Inktomi's Search Platform for FindWhat.com," Aug. 18, 1999, http://www.findwhat.com/static/press_081899.html, pp. 1-3.

FindWhat.com, "What we found . . . ," Sep. 3, 1999, pp. 1-3.

I Seek It, "FAQ," Sep. 8, 1999, http://www.iseekit.com/faq.htm, pp. 1-4.

I Seek It, "Terms," Sep. 8, 1999, http://www.iseekit.com/terms.htm, pp. 1-3.

I Seek It, "Change," Sep. 8, 1999, http://www.iseekit.com/change1.htm, pp. 1-5.

I Seek It, "Deposit," Sep. 8, 1999, http://www.iseekit.com/deposit.htm, pp. 1-2.

I Seek It, "Books," Sep. 8, 1999, http://www.iseekit.com/books.htm, pp. 1-2.

Hitsgalore.com, "Free Robust Web-Based Internet E-Mail Service: 'Hitsmail™,'" Sep. 8, 1999, http://www.hitsgalore.com/press_071399.shtml, pp. 2-4.

Hitsgalore.com, "Keyword Bid & Rank," Sep. 8, 1999, http://www.hitsgalore.com/bidrank.shtml, pp. 1-2.

Hitsgalore.com, "Search Results," Sep. 8, 1999, http://www.hitsgalore.com/sys/search.cgi?keyword=cars, pp. 1-2.

SearchUp.com, "About SearchUp," Jul. 15, 1999, http://www.searchup.cm/about.cfm, pp. 1-2.

SearchUp.com, "Benefits," Jul. 15, 1999, http://www.searchup.com/benefits.cfm, pp. 1-3.

SearchUp.com, "Web Sites with 'cars'," Aug. 25, 1999, http://www.searchup.com/search.cfm, pp. 1-3.

SearchUp.com, "Position Manager," Aug. 25, 1999, https://www.securearea.net/searchup/login.cfm, 1 page.

SearchUp.com, "Create a New Account," Aug. 25, 1999, https://www.securearea.net/searchup/newaccount.cfm, pp. 1-2.

SearchUp.com, "URL Position Manager," Aug. 25, 1999, https://www.securearea.net/searchup/getaccount.cfm, pp. 1-2.

SearchUp.com, "Add New URL To: Personal Web Sites: Individual Web Sites: L's Last Name," Aug. 25, 1999, https://www.securearea.net/searchup/addurl.cfm, pp. 1-2.

SearchUp.com, "Payment Information," Aug. 25, 1999, https://www.securearea.net/searchup/yesaddurl.cfm, pp. 1-2.

SearchUp.com, "Our Commitment," Aug. 25, 1999, https://www.securearea.net/searchup/commitment.cfm, 1 page.

CNET Networks, Inc., "Engine sells results, draws fire," Jun. 21, 1996, http://news.com.com/2100-1023-215491.html?legacy=cnet, pp. 1-3.

Paula MacKinnon, "Relevancy and Ranking . . . by Wealth," Jun. 19, 1996, http://sunsite.berkeley.edu/Web4Lib/archive/9606/0243.html, pp. 1-2.

Search Engine Watch, "Lycos Adds New Features, Reorganizes Suggested Links," Jan. 9, 1998, http://searchenginewatch.com/sereport/98/01-lycos.html, pp. 1-5.

Search Engine Watch, "Lycos Adds Predetermined Listings," Dec. 4, 1997, http://searchenginewatch.com/sereport/97/12-lycos.html, pp. 1-5.

Arthur Weiss, "The evolution of World Wide Web search tools," pp. 289-295.

Search Engine Watch, "Promoters Call for Certification," Aug. 4, 1998, http://searchenginewatch.com/sereport/98/08-certfication.html, pp. 1-6.

Katherine Gallagher et al., "A Framework for Targeting Banner Advertising on the Internet," 1997, IEEE, pp. 265-174.

International Searchng Authority, "Notification of the Transmittal of the International Search Report and the Written Opinion of the International Searching Authority of the Declaration," PCT/US2005/009597, dated Aug. 26, 2005, 13 pages.

Current Claims, PCT/US2005/009597, 5 pages.

Speck, Hendrik, et al., "Valhalla—Distributed Information Architecture," Advanced Communication Technology, 2004, XP-010701464, pp. 1049-1054.

ANONYMOUS, "Search Results Advertisements," IP.COM Journal, IP.COM Inc., West Henrietta N.Y., Jun. 19, 2003, XP-013007875, pp. 1-2.

International Searching Authority, "Notification of Transmittal of International Preliminary Report on Patentability and Written Opinion of the International Searching Authority," dated Oct. 12, 2006, PCT/US2005/009597, 9 pgs.

PCT/US2005/009597—current claims, 3 pgs.

* cited by examiner

DELIVERING ITEMS BASED ON LINKS TO RESOURCES ASSOCIATED WITH SEARCH RESULTS

FIELD OF THE INVENTION

The present invention relates to computer networks and, more particularly, to techniques for delivering items based on links associated with search results.

BACKGROUND OF THE INVENTION

The Internet is a worldwide system of computer networks and is a public, self-sustaining facility that is accessible to tens of millions of people worldwide. The most widely used part of the Internet is the World Wide Web, often abbreviated "WWW" or simply referred to as just "the Web". The Web is an Internet service that organizes information through the use of hypermedia. The HyperText Markup Language ("HTML") is used to specify the contents and format of a hypermedia document (e.g., a Web page).

In this context, an HTML file is a file that contains the source code for a particular Web page. A Web page is the image that is displayed to a user when a particular HTML file is rendered by a browser application program. Unless specifically stated, an electronic or Web document may refer to either the source code for a particular Web page or the Web page itself. Each page can contain imbedded references to images, audio, video or other Web documents. The most common type of reference used to identify and locate resources on the Internet is the Uniform Resource Locator, or URL. In the context of the Web, a user, using a Web browser, browses for information by following references that are embedded in each of the documents. The HyperText Transfer Protocol ("HTTP") is the protocol used to access a Web document and the references that are based on HTTP are referred to as hyperlinks (formerly, "hypertext links").

Through the use of the Web, individuals have access to millions of pages of information. However a significant drawback with using the Web is that because there is so little organization to the Web, at times it can be extremely difficult for users to locate the particular pages that contain the information that is of interest to them. To address this problem, a mechanism known as a "search engine" has been developed to index a large number of Web pages and to provide an interface that can be used to search the indexed information by entering certain words or phases to be queried. These search terms are often referred to as "keywords".

Indexes used by search engines are conceptually similar to the normal indexes that are typically found at the end of a book, in that both kinds of indexes comprise an ordered list of information accompanied with the location of the information. Values in one or more columns of a table are stored in an index, which is maintained separately from the actual database table. An "index word set" of a document is the set of words that are mapped to the document in an index. For documents that are not indexed, the index word set is empty.

Although there are many popular Internet search engines, they are generally constructed using the same three common parts. First, each search engine has at least one "spider" that "crawls" across the Internet to locate Web documents around the world. Upon locating a document, the spider stores the document's URL, and follows any hyperlinks associated with the document to locate other Web documents. Second, each search engine contains an indexing mechanism that indexes certain information about the documents that were located by the spider. In general, index information is generated based on the contents of the HTML file. The indexing mechanism stores the index information in large databases that can typically hold an enormous amount of information. Third, each search engine provides a search tool that allows users to search the databases in order to locate specific documents that contain information that is of interest to them.

The search engine provides an interface that allows users to specify their search criteria (e.g., keywords) and, after performing a search, an interface for displaying the search results. Typically, the search engine orders the search results prior to presenting the search results interface to the user. The order usually takes the form of a "ranking", where the document with the highest ranking is the document considered most likely to satisfy the interest reflected in the search criteria specified by the user. The specific techniques for determining that ranking will vary from implementation to implementation, and the present invention is not limited to any particular ranking technique.

Once the matching documents have been determined, and the display order of those documents has been determined, the search engine sends to the user that issued the search a "search results page" that presents information about the matching documents in the selected display order. Typically, the number of documents that match a search is so large that the user is presented with a search results page that only displays information about the top N ranking documents, where N may be significantly smaller than the total number of matching documents. The search results page typically includes a control that allows the user to retrieve information about the "next N" matching documents, in case the first N matching documents do not entirely satisfy the users interest.

Significantly, the search results pages do not present to users the matching documents themselves, but merely data that identifies the matching documents. The data presented by the search results page for any given matching page is referred to herein as the "search result listing" for the page. The search result listings that are presented by the search results page frequently take the form of text that has been extracted from the documents themselves. For example, search results may present the "title" and "abstract" of each matching web page, where the title and abstract consist of text extracted from corresponding meta-data fields within the web pages. Typically, each entry in the search result listing includes a hyperlink which, when selected, causes the user's browser to retrieve the corresponding matching document.

Since providers of search services typically do not charge users, i.e., the searchers, for the use of the search services, search service providers often find their economic viability in charging money for presenting advertisements on search sites. The sponsored advertisements are returned in association with a search results listing. Use of the term "advertising" herein includes traditional advertising of products and services to the searcher, as well as instructional advertising, in which one provides any type of information to present to a searcher in association with search results. For example, one may want to direct a searcher to a web site for informational purposes rather than for marketing purposes. The content of advertisements may include information about products, services or otherwise, with or without a link to a resource that is associated with the advertised content, such as a web page.

This type of advertising model is typically implemented by allowing "advertisers" to subscribe to a service provided by the search service provider, whereby an advertiser can provide an advertisement for presentation to a searcher as part of a search results page. Currently, which advertisements to present to searchers is most often based on the search criteria or keywords that the searcher provides to the search engine for querying the associated index and database of web content. Therefore, advertisers must register with the service multiple keywords that the advertisers want to act as a trigger to the presentation of their advertisement. In response to a searcher submitting a query that includes any of the registered keywords, the search service provider includes one or more of the associated advertisements with a search results listing. Hence, determination of the advertisements to present in conjunction with a search results listing is based solely on the keywords that were registered in association with the advertisement. This type of approach puts a significant burden on the advertiser in registering what is typically a large set of keywords and combinations of keywords in association with their advertisement.

In contrast, another approach to presenting advertisements in association with search results listings is based on the results or output of the search, rather than on the input to the search, i.e., the keywords. An example of this approach is described in U.S. Pat. No. 6,564,208 to Littlefield et al., entitled "Delivering Non-Default Items In Association With Search Results."

Based on the foregoing, there is a need for techniques that allow a party to present information in association with search result listings, based on the search results.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF EMBODIMENTS OF THE INVENTION

Figure 1:
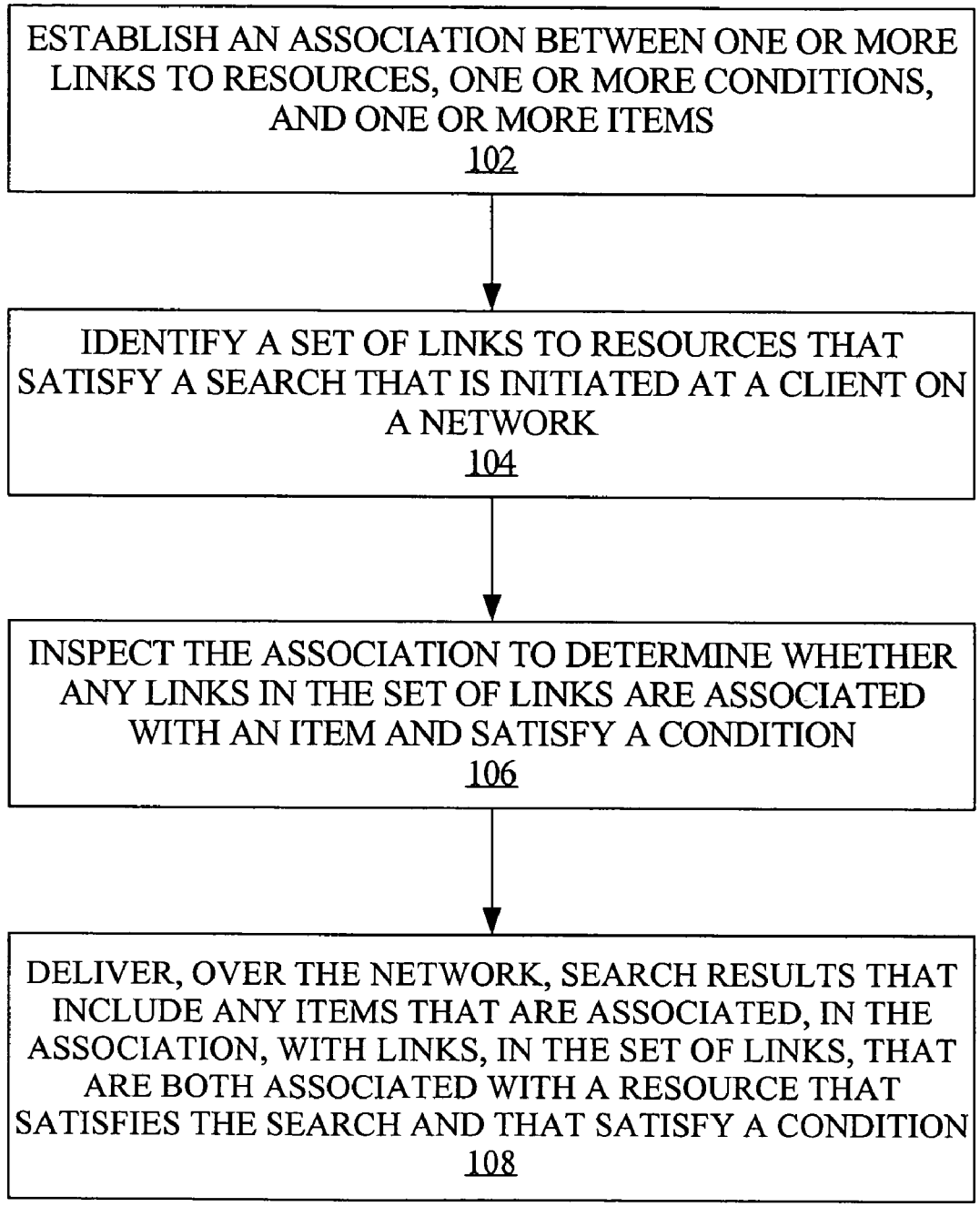
FIG. 1 is a flow diagram that illustrates a method for delivering search results for searches conducted over a network, according to an embodiment of the invention.

A method and system are described for providing search results pages that contain items associated with links to resources associated with search result listings. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Functional Overview of Embodiments

Techniques are provided for delivering search results pages to the users of a search engine, where one or more search result listings on the search results pages include one or more items that are associated with links to resources that satisfy a related search and that satisfy a specified condition. The items may take many forms, including but not limited to images, banners, controls, animations, applets in the JAVA language, reviews/ratings, interfaces to procedures or web services, dynamically-generated content, and the like. The items that are delivered with the search results may be associated with a party that is different than the party that controls the resource to which the link is associated. Hence, the items that are delivered with the search results may be items that are not derived from nor contained in a resource reached by a link to which the item is associated. Furthermore, the items that are delivered with the search results may be links to resources that are not in a set of links to resources that satisfy the search. The items may be delivered such that any item that is displayed based on the item's association with a link to a resource is displayed in a frame of display that is different than a frame of the display in which the link to which the item is associated is displayed The party that controls the search engine may charge web page owners in a manner similar to the publishers of directories such as the YELLOW PAGES. For example, a party may subscribe to have one of its advertisements associated with a link to a web page that is associated with a certain context. For example, a party that owns a bed and breakfast facility may subscribe to have an advertisement delivered with search results that include a link to a specific travel-related web page or that include a link to a specific town's chamber of commerce. The amount charged by the search engine controller may vary based on a variety of factors, including the size and type of the items that are delivered with the search result listings that include the relevant links to resources. In scenarios in which the item delivered with the search results is itself a link to a resource, instead of or in addition to a subscription fee for associating the item with links to resources contained in search result listings, search engine provider may also charge click-through fees based on how many times the search engine users actually select the link to the resource.

Method for Delivering Search Results

FIG. 1 is a flow diagram that illustrates a method for delivering search results for searches conducted over a network, according to an embodiment of the invention. The method steps may be performed, for example, by what is commonly referred to as a search engine. Delivery of items along with search results is based on the presence, in a set of links to resources that satisfy a search, of links to resources that satisfy one or more conditions associated with the search results.

Establishing Associations Between Links, Conditions and Items

At block 102, an association is established between one or more links to resources, one or more conditions, and one or more items. In one embodiment, the links to resources include URLs. In a related embodiment, the URLs are hypertext links. A party that wants an item displayed along with search results listings needs to associate the item that the party wants displayed with the links to resources that, when included in a set of links that satisfy a search criteria, trigger the delivery of the item for display along with the search result listings. Furthermore, since the logic involved with determining what item(s) to deliver with the search results is rule-based, the party needs to also associate rules (also referred to as conditions) with the links to resources that trigger the delivery of the item for display along with the search result listings.

A variety of techniques may be used to establish associations between resource links that are included in search results, conditions to apply to such links, and items to deliver with the search results. For example, a party may pay a yearly subscription fee to have a particular item, such as link to the party's home page, associated with the home page of another party. To facilitate such subscriptions, the search engine provider may establish a web server for receiving such subscriptions over the Internet. The web server presents users with a web page that includes interface controls for specifying a links to resources, specifying conditions to apply to the specified links if returned as search results, for specifying the item(s) to deliver with the search results if a link satisfies a condition and for associating the links, conditions and items. The web page may include, for example, controls for indicating that the item should be displayed in bold, in a particular font, and/or in a font of a particular size. The web page may also include controls for uploading other types of items, such as a graphic, an audio file, a movie file, an animation, an applet in the JAVA language, a procedural interface, and the like.

Once the subscriber has established the necessary parameters and associations, i.e., identified the resource links, specified the conditions and specified or uploaded the items to be associated with the search results, the web server stores the information and/or metadata that underlies these parameters and associations, on a storage device that is accessible by the search engine. For example, the information may be stored in tables of a relational database. The actual location at which the parameters are stored, and the retrieval mechanism used to deliver the items on the appropriate search results pages, will vary from implementation to implementation. For example, in an embodiment, the items and conditions are stored in the same repository that is used by the search engine to store search results for a given search.

Association Example

Suppose an owner of a "bed & breakfast" establishment in Napa, Calif. wants an advertisement in a specified form (i.e., an item) to be displayed with search results of a particular context that are returned in response to client web searches. For example, the owner may want an advertisement displayed that includes the URL to a web page from which a reservation can be made to the establishment. The context with which the owner wants to associate the advertisement is defined through specification of some conditions. For example, the owner defines the context to consist of search results that include particular links to resources, such as one or more Napa Valley sites, one or more travel sites, and one or more bed and breakfast related sites. Hence, the owner may associate the following URLs to the advertisement item and register the association with the search engine provider: www.cityofnapa.org, www.expedia.com, and www.bnb.com. Further, the owner associates a condition with the resource links-item association. For example, the condition may specify that if any two of the foregoing three resource links are included in the top ten links that are identified as a set of links to resources that satisfy a search, then deliver the specified advertisement with the search results of any such search.

Processing in Response to a Search

Blocks 104-108 are performed in response to a search for resources that is initiated by a client on a network. In other words, blocks 104-108 are performed at search runtime.

At block 104, a set of links to resources that satisfy the search is identified. Since different search engines use different, often proprietary, search algorithms, the technique for identifying resources that satisfy a client search request may vary from implementation to implementation. Generally, such algorithms take the search criteria, i.e., keywords, as input, and match the search criteria against a database of known resources, e.g., web pages. The resources that are found to satisfy the search criteria are identified and compiled as search results, along with the links to such resources. Typically, these resources and resource links are then used to generate a search results listing, e.g., a web page, for delivery to the search client.

Condition Satisfaction

At block 106, the association that was established at block 102 is retrieved and inspected to determine whether any links to resources, from the set of links that was identified at block 104, are associated with an item and satisfy a condition. For an example of blocks 104 and 106, the search engine may (1) use an index on the database of web resources to determine the resources that satisfy a search; (2) identify resource links that are associated with the resources that satisfy the search; (3) determine, from the association, whether any of the identified resource links are associated with an item; (4) consult a mapping, from the association, of resource links-to-associated conditions to identify which, if any, conditions are associated with the identified resource links that are associated with an item; (5) determine whether any of the identified resource links that are associated with an item satisfy any of the identified conditions; and (6) retrieve from the repository both (a) the search result listing associated with the client search and (b) the items that are associated with links (i) to resources that satisfy the search and (ii) that satisfy an identified condition.

Search Results Delivery

At block 108, search results are delivered which include any items that are associated, based on the registered association, with links to resources that satisfy a condition. Certain types of items, such as graphics, are included in the search results page by embedding tags to such items in the page. When a browser decodes such tags, the browser retrieves the items, and displays the retrieved items at the appropriate locations within the web page.

In some implementations, the party that provides the front end to the search engine is a different party than the party that controls the search engine. In such implementations, the search engine may provide the items along with the standard search result listings to the front end provider, and the front end provider includes both the standard search result listings and the items in the search results page that it delivers to the client.

There is virtually no limit to types of items that can be delivered and displayed with the search result listings. For example, the items may be active, passive, static, dynamic, visual, audio, and may have no logical relationship with the associated resource whose link triggered the inclusion of the item. Consequently, there is virtually no limit to the uses of such items. A typical use of such items would be to entice the search engine user to interact with or somehow respond to the item displayed with the search result listing.

Conflict Resolution

There are numerous situations that may arise that create conflicts with respect to multiple resource links that are associated with resources that satisfy search criteria, are associated with an item, and satisfy a condition. Thus, a conflict exists as to which item to deliver with the search results.

For example, a first resource that is associated with a first party may meet all the criteria for returning a first item with an associated search result listing, and a second resource that is associated with the first party may meet all the criteria for returning a second item with an associated search result listing, creating a conflict as to which item to return with the search result listing. For another example, a first resource that is relative to a first context (e.g., a search on "bed" and "breakfast" finding a resource in a context of sales of beds) and that is associated with a first party may meet all the criteria for returning a first item with an associated search result listing, and a second resource that is relative to a second context (e.g., a search on "bed" and "breakfast" finding a resource in a context of sales of breakfast cereals) and that is associated with a second party may meet all the criteria for returning a second item with an associated search result listing, creating a conflict as to which party's item to return with the search result listing.

In embodiments, several approaches can be implemented to resolve such conflicts. One such approach is to provide a mechanism for the client parties to weight the resources (or links to resources) so that a resource with a greater weight "wins" a conflict. Furthermore, such a mechanism may require more compensation from the client party for application of a greater weight to that party's resource. Another approach is to weight resources based on their ranking in the search results listing, where resources having a higher ranking are given a higher weight. This approach can be independent of any influence from the client party and based on the ranking mechanism of the underlying search engine. Yet another approach is to weight resources based on historical information about "click-through" operations to or from the resource, where resources having a higher click-through rate are given a higher rate. This approach can also be independent of any influence from the client party and based on real historical information.

Participants

In an embodiment, the items that are delivered with the search results may be associated with a party that is different than the party that controls the resource to which the link is associated. Hence, the items that are delivered with the search results may be items that are not derived from nor contained in a resource reached by a link to which the item is associated. Furthermore, the items that are delivered with the search results may be links to resources that are not in a set of links to resources that satisfy the search.

Search Domain

The techniques described herein have been described in an embodiment in which the search domain is web documents on the World Wide Web. However, the techniques are not limited to searches performed in this domain. For example, search engines used to locate electronic items within any intranet or extranet network may also effectively employ the techniques. Further, the search is not limited to a search of web pages, but may include other types of electronic files, such as text files, word processing documents, graphics or even sound files. When the search is for non-text items such as graphics, the default search result listing for the items may include, for example, thumbnails of the graphics along with a link to web site that is hosting or that owns the graphics. However, the techniques provided herein allow material that is separate and distinct from the search items themselves to be associated with the search result listings.

Hardware Overview

Figure 2:
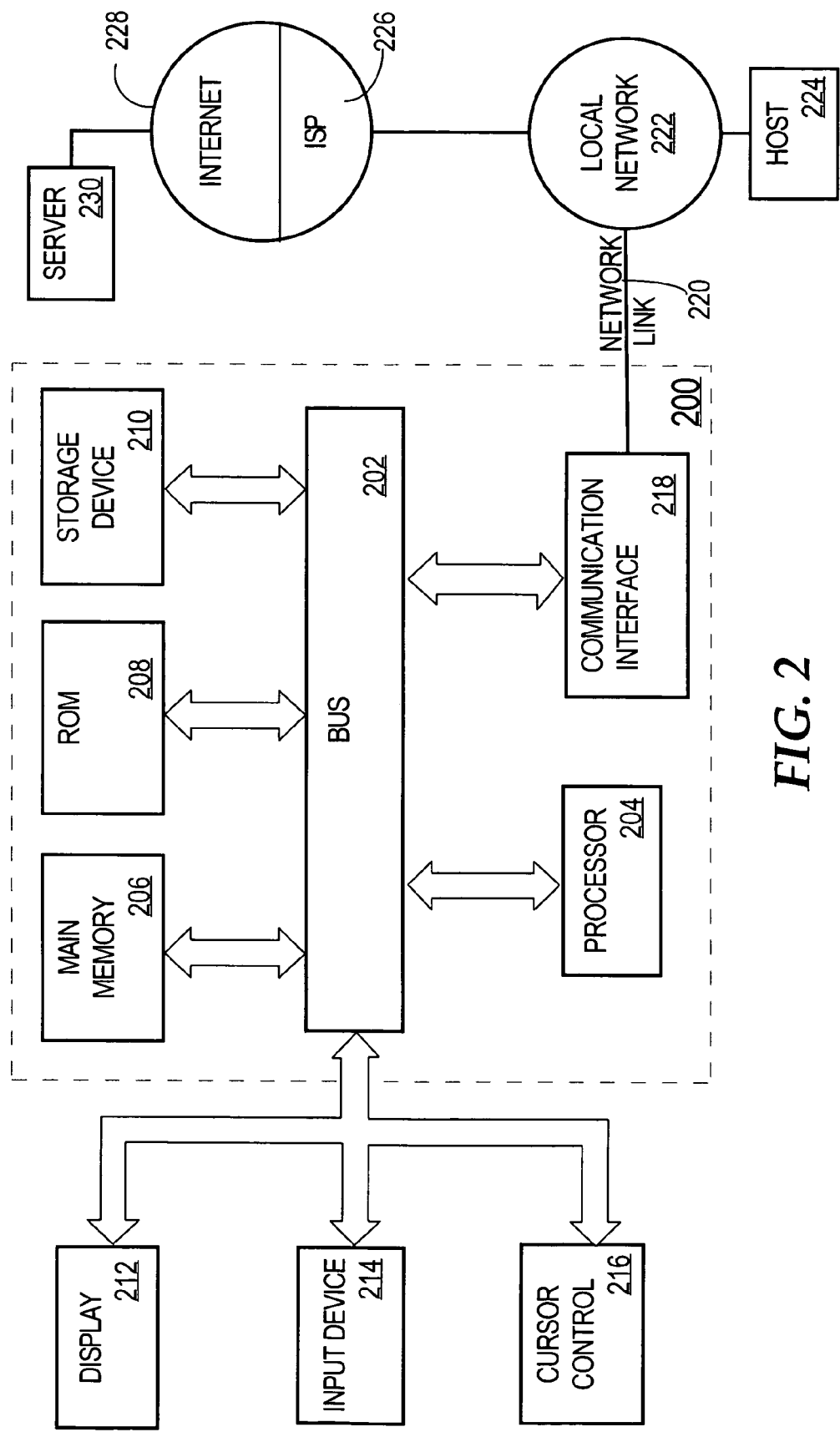
FIG. 2 is a block diagram of a computer system that may be used to implement embodiments of the invention.

FIG. 2 is a block diagram that illustrates a computer system 200 upon which an embodiment of the invention may be implemented. Computer system 200 includes a bus 202 or other communication mechanism for communicating information, and a processor 204 coupled with bus 202 for processing information. Computer system 200 also includes a main memory 206, such as a random access memory (RAM) or other dynamic storage device, coupled to bus 202 for storing information and instructions to be executed by processor 204. Main memory 206 also may be used for storing temporary variables or other intermediate information during execution of instructions to be executed by processor 204. Computer system 200 further includes a read only memory (ROM) 208 or other static storage device coupled to bus 202 for storing static information and instructions for processor 204. A storage device 210, such as a magnetic disk or optical disk, is provided and coupled to bus 202 for storing information and instructions.

Computer system 200 may be coupled via bus 202 to a display 212, such as a cathode ray tube (CRT), for displaying information to a computer user. An input device 214, including alphanumeric and other keys, is coupled to bus 202 for communicating information and command selections to processor 204. Another type of user input device is cursor control 216, such as a mouse, a trackball, or cursor direction keys for communicating direction information and command selections to processor 204 and for controlling cursor movement on display 212. This input device typically has two degrees of freedom in two axes, a first axis (e.g., x) and a second axis (e.g., y), that allows the device to specify positions in a plane.

The invention is related to the use of computer system 200 for implementing the techniques described herein. According to one embodiment of the invention, those techniques are implemented by computer system 200 in response to processor 204 executing one or more sequences of one or more instructions contained in main memory 206. Such instructions may be read into main memory 206 from another computer-readable medium, such as storage device 210. Execution of the sequences of instructions contained in main memory 206 causes processor 204 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 204 for execution. Such a medium may take many forms, including but not limited to, non-volatile media, volatile media, and transmission media. Non-volatile media includes, for example, optical or magnetic disks, such as storage device 210. Volatile media includes dynamic memory, such as main memory 206. Transmission media includes coaxial cables, copper wire and fiber optics, including the wires that comprise bus 202. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 204 for execution. For example, the instructions may initially be carried on a magnetic disk of a remote computer. The remote computer can load the instructions into its dynamic memory and send the instructions over a telephone line using a modem. A modem local to computer system 200 can receive the data on the telephone line and use an infra-red transmitter to convert the data to an infra-red signal. An infra-red detector can receive the data carried in the infra-red signal and appropriate circuitry can place the data on bus 202. Bus 202 carries the data to main memory 206, from which processor 204 retrieves and executes the instructions. The instructions received by main memory 206 may optionally be stored on storage device 210 either before or after execution by processor 204.

Computer system 200 also includes a communication interface 218 coupled to bus 202. Communication interface 218 provides a two-way data communication coupling to a network link 220 that is connected to a local network 222. For example, communication interface 218 may be an integrated services digital network (ISDN) card or a modem to provide a data communication connection to a corresponding type of telephone line. As another example, communication interface 218 may be a local area network (LAN) card to provide a data communication connection to a compatible LAN. Wireless links may also be implemented. In any such implementation, communication interface 218 sends and receives electrical, electromagnetic or optical signals that carry digital data streams representing various types of information.

Network link 220 typically provides data communication through one or more networks to other data devices. For example, network link 220 may provide a connection through local network 222 to a host computer 224 or to data equipment operated by an Internet Service Provider (ISP) 226. ISP 226 in turn provides data communication services through the world wide packet data communication network now commonly referred to as the "Internet" 228. Local network 222 and Internet 228 both use electrical, electromagnetic or optical signals that carry digital data streams. The signals through the various networks and the signals on network link 220 and through communication interface 218, which carry the digital data to and from computer system 200, are exemplary forms of carrier waves transporting the information.

Computer system 200 can send messages and receive data, including program code, through the network(s), network link 220 and communication interface 218. In the Internet example, a server 230 might transmit a requested code for an application program through Internet 228, ISP 226, local network 222 and communication interface 218. In accordance with the invention, one such downloaded application implements the techniques described herein.

The received code may be executed by processor 204 as it is received, and/or stored in storage device 210, or other non-volatile storage for later execution. In this manner, computer system 200 may obtain application code in the form of a carrier wave.

Extensions and Alternatives

Alternative embodiments of the invention are described throughout the foregoing description, and in locations that best facilitate understanding the context of the embodiments. Furthermore, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

In addition, in this description certain process steps are set forth in a particular order, and alphabetic and alphanumeric labels may be used to identify certain steps. Unless specifically stated in the description, embodiments of the invention are not necessarily limited to any particular order of carrying out such steps. In particular, the labels are used merely for convenient identification of steps, and are not intended to specify or require a particular order of carrying out such steps.

What is claimed is:

1. A method for delivering search results for searches conducted over a network, the method comprising the steps of:
    establishing an association between one or more links to resources, one or more conditions, and one or more items;
    in response to a search for resources initiated at a client on said network, performing the steps of
        identifying a set of links to resources satisfying said search;
        inspecting said association to determine whether any links in said set of links are associated with an item of the one or more items and whether any links in said set of links satisfy a condition of the one or more conditions; and
        delivering search results over said network;
        wherein said search results include any items associated in said association with particular links in said set of links if and only if said particular links satisfy a condition of the one or more conditions.

2. The method of claim 1, wherein said resources satisfying said search is controlled by one or more first parties and said any items associated with said particular links are associated with a second party which is different from said one or more first parties.

3. The method of claim 1, wherein at least one of said one or more items is a link to a resource not in said set of links to resources.

4. The method of claim 1, wherein all of said one or more items are links to resources not in said set of links to resources.

5. The method of claim 1, wherein said one or more links to resources is a uniform resource locator (URL).

6. The method of claim 5, wherein said uniform resource locator (URL) is a hypertext link.

7. The method of claim 1 wherein:
    the search is for web documents residing on any one of the World Wide Web, an intranet, and an extranet network; and
    the step of identifying a set of links to resources satisfying said search is performed by identifying a set of links to web documents satisfying said search.

8. The method of claim 1 wherein the step of establishing an association between one or more links to resources and one or more items includes associating a link to a resource with an item not derived from nor contained in a resource corresponding to said link.

9. The method of claim 1 wherein the step of delivering search results includes delivering said search results for display such that any item displayed based on the item's association with a link to a resource is displayed unassociated with said link to which the item is associated.

10. The method of claim 1 wherein the step of delivering search results includes delivering said search results for display such that any item displayed based on the item's association with a link to a resource is displayed in a frame of display different than a frame of display in which said link to which the item is associated is displayed.

11. The method of claim 1 wherein:
the step of delivering search results over said network to said client is part of a service performed by a first party;
said one or more items are associated with one or more second parties; and
the method further includes the step of said one or more second parties paying said first party to associate said one or more items with links to resources corresponding to resources controlled by one or more third parties.

12. The method of claim 11, wherein at least one item of said one or more items is an advertisement associated with a second party of said one or more second parties.

13. The method of claim 1, wherein at least one item of said one or more items is dynamically generated content.

14. The method as recited in claim 1, further comprising: receiving input that specifies said one or more conditions.

15. The method as recited in claim 14 wherein said input defines a context.

16. The method as recited in claim 15 wherein at least one of said one or more items comprises a specified form for an advertisement to be displayed upon said search results conforming to said context.

17. The method as recited in claim 1 wherein said the step of establishing an association comprises:
establishing an association between an advertisement, a particular set of one or more links, and conditions relating to a ranking of the particular set of one or more links within a set of search results; and
wherein the step of delivering the search results includes presenting the advertisement.

18. The method as recited in claim 1 wherein a plurality of said particular resource links satisfy a condition of the one or more conditions, and wherein a conflict arises relating to which said item of said one or more items is to be delivered with said search results, said method further comprising:
determining weights associated with one or more of said resources that satisfy the search and said links thereto;
comparing said determined weights; and
selecting among said determined weights based on said comparing, wherein said selecting resolves said conflict;
wherein said delivering comprises delivering said one or more of said resources and said
links based on said selecting.

19. The method as recited in claim 18 wherein the step of determining weights is based on a ranking of said search results.

20. The method as recited in claim 18 wherein the step of determining weights is based on consideration paid by one or more entities associated with said one or more resources.

21. The method as recited in claim 18, further comprising: maintaining historical information relating to instances wherein said one or more resources are accessed.

22. The method as recited in claim 21 wherein said weighting is based on said historical information.

23. A system comprising:
means for establishing an association between one or more links to resources, one or more conditions, and one or more items;
wherein said means for establishing includes a computer-readable storage medium that stores data representing the association between said one ore more links;
means for identifying a set of links to resources satisfying a search for resources initiated at a client on a network;
means for inspecting said association to determine whether any links in said set of links are associated with an item of the one or more items and satisfy a condition of the one or more conditions; and
means for delivering search results over said network;
wherein said search results include any items associated in said association with particular links in said set of links if and only if said particular links satisfy a condition of the one or more conditions.

24. A computer-readable storage medium carrying one or more sequences of instructions for delivering search results for searches conducted over a network, wherein execution of the one or more sequences of instructions by one or more processors causes performance of:
establishing an association between one or more links to resources, one or more conditions, and one or more items;
in response to a search for resources initiated at a client on said network, performing the steps of
identifying a set of links to resources satisfying said search;
inspecting said association to determine whether any links in said set of links are associated with an item of the one or more items and whether any links in said set of links satisfy a condition of the one or more conditions; and
delivering search results over said network;
wherein said search results include any items associated in said association with particular links in said set of links if and only if said particular links satisfy a condition of the one or more conditions.

25. The computer-readable storage medium of claim 24, wherein said resources satisfying said search is controlled by one or more first parties and said any items associated with said particular links are associated with a second party which is different from said one or more first parties.

26. The computer-readable storage medium of claim 24, wherein at least one of said one or more items is a link to a resource not in said set of links to resources.

27. The computer-readable storage medium of claim 24, wherein all of said one or more items are links to resources not in said set of links to resources.

28. The computer-readable storage medium of claim 24, wherein said one or more links to resources is a uniform resource locator (URL).

29. The computer-readable storage medium of claim 28, wherein said uniform resource locator (URL) is a hypertext link.

30. The computer-readable storage medium of claim 24 wherein:
the search is for web documents residing on any one of the World Wide Web, an intranet, and an extranet network; and
said identifying a set of links to resources satisfying said search includes identifying a set of links to web documents satisfying said search.

31. The computer-readable storage medium of claim 24 wherein said establishing an association between one or more links to resources and one or more items includes associating a link to a resource with an item not derived from nor contained in a resource corresponding to said link.

32. The computer-readable storage medium of claim 24 wherein said delivering search results includes delivering said search results for display such that any item displayed based on the item's association with a link to a resource is displayed unassociated with said link to which the item is associated.

33. The computer-readable storage medium of claim 24 wherein said delivering search results includes delivering said search results for display such that any item displayed based on the item's association with a link to a resource is displayed in a frame of display different than a frame of display in which said link to which the item is associated is displayed.

34. The computer-readable storage medium of claim 24 wherein:

said delivering search results over said network to said client is part of a service performed by a first party;

said one or more items are associated with one or more second parties; and said one or more second parties pay said first party to associate said one or more items with links to resources corresponding to resources controlled by one or more third parties.

35. The computer-readable storage medium of claim 34, wherein at least one item of said one or more items is an advertisement associated with a second party of said one or more second parties.

36. The computer-readable storage medium of claim 24, wherein at least one item of said one or more items is dynamically generated content.

* * * * *